United States Patent
Lee et al.

(10) Patent No.: US 9,059,437 B2
(45) Date of Patent: Jun. 16, 2015

(54) HEATING APPARATUS AND METHOD FOR FUEL CELL

(71) Applicant: Hyundai Motor Company, Seoul (KR)

(72) Inventors: Sung Ho Lee, Gyeonggi-do (KR); Sun Bo Shim, Seoul (KR)

(73) Assignee: Hyundai Motor Company, Seoul (KR)

( * ) Notice: Subject to any disclaimer, the term of this patent is extended or adjusted under 35 U.S.C. 154(b) by 159 days.

(21) Appl. No.: 13/846,504

(22) Filed: Mar. 18, 2013

(65) Prior Publication Data

US 2014/0186730 A1    Jul. 3, 2014

(30) Foreign Application Priority Data

Dec. 28, 2012  (KR) .................. 10-2012-0156289

(51) Int. Cl.
*H01M 8/04*    (2006.01)
(52) U.S. Cl.
CPC ...... *H01M 8/04037* (2013.01); *H01M 8/04067* (2013.01); *H01M 8/04268* (2013.01); *H01M 2250/20* (2013.01); *Y02E 60/50* (2013.01); *Y02T 90/32* (2013.01)

(58) Field of Classification Search
CPC ................ H01M 8/04037; H01M 8/04268; H01M 2250/20; Y02T 90/32; Y02E 60/50
USPC .......................................... 429/429
See application file for complete search history.

(56) References Cited

U.S. PATENT DOCUMENTS

2008/0118787 A1*  5/2008  Wexel et al. ............. 429/13
2008/0318100 A1* 12/2008  Owejan ................... 429/26

FOREIGN PATENT DOCUMENTS

| JP | 2003-045463 A | 2/2003 |
|---|---|---|
| JP | 2004-152681 A | 5/2004 |
| KR | 10-2008-0104188 A | 12/2008 |
| KR | 10-2009-0006344 A | 1/2009 |
| KR | 10-0893431 B1 | 4/2009 |
| KR | 10-2012-0115723 | 10/2012 |

* cited by examiner

*Primary Examiner* — Stewart Fraser
(74) *Attorney, Agent, or Firm* — Mintz Levin Cohn Ferris Glovsky and Popeo, P.C.; Peter F. Corless

(57) ABSTRACT

A heating apparatus for a fuel cell that includes heating units that extend in the stacking direction of a plurality of separators, in contact with upper ends and lower ends of air intake sides of the stacked separators.

4 Claims, 3 Drawing Sheets

HEATING APPARATUS AND METHOD FOR FUEL CELL

CROSS-REFERENCE TO RELATED APPLICATION

This application claims under 35 U.S.C. §119(a) the benefit of Korean Patent Application No. 10-2012-0156289 filed Dec. 28, 2012, the entire contents of which are incorporated herein by reference.

BACKGROUND (a) Technical Field

The present invention relate to a heating apparatus and method for a fuel cell which reduces a cold-starting time of a fuel cell vehicle, by appropriately heating the fuel cell based on an internal temperature distribution.

(b) Background Art

Typically, in a fuel cell vehicle there is a time delay during cold-starting due to a difference in internal temperature of a stack. More specifically, a non-reacting low-temperature area and a reacting area locally and simultaneously increase in temperature due to ice blockage and the differences in internal temperature of a separator a when the vehicle is starting under cold weather conditions.

Further, the maximum temperature Tmax occurs at the center of a unit cell and the minimum temperature Tmin occurs around the air inlet, where Tmin is about −10~−5° C. and Tmax is about 10~30° C., which means there is an area of the fuel cell which is below zero (T <0° C.) (e.g., about 10~20% of the fuel cell). Further, the lower the external temperature, the larger the difference in the unit cell temperature (maximum 40° C. @ T∞=−25° C.).

Accordingly, some in the industry have proposed heating the frozen fuel cell stack to reduce the ice in the system, but in this process it is difficult to determine the internal temperature distribution. This is because when a stack is heated with a uniform stack temperature distribution, the high-temperature area of the stack is overheated before the low-temperature area is unfrozen, which may cause issues within the stack. Therefore, it was required to develop a technology that reduces the amount of time it takes to cold start a fuel cell vehicle while at the same time appropriately heating the stack based on internal temperature distribution.

Meanwhile, although the distribution of internal temperature of a stack of a fuel cell is an important parameter to determine, only very limited information has been known due to difficulty of mounting a fine internal structure sensor. Therefore, since it is difficult to determine the internal temperature during cold-starting operation, the internal temperature is often estimated from the temperature of the air outlet, but these measurements are purely estimation and are not based on an actual distribution, since currently there is no technology for accurately determining the internal distribution.

Further, most of the technologies were implemented for the entire system of a stack due to the absence of internal information and there is no cold-starting technology for internal differences of a stack. Therefore, it was required to find and heat a low-temperature area by accurately finding out the temperature differences, because supplying more thermal energy to improving cold-starting is a technology that is likely to cause problems relating to local overheating internally.

In a related fuel cell stack a membrane electrode assembly including an electrolyte membrane, an anode, and a cathode, and a separator disposed at both sides of the membrane electrode assembly are included within the stack. A cooling water channel is formed on one side of the separator, and a cooling water intake manifold and a cooling water exit manifold are formed at both ends of the separator, respectively. The cooling water intake manifold is connected with the cooling water channel by a connection channel and has a first space horizontally facing the connection channel and a second space disposed above the first space and trapping bubbles. However, the above described structure does not improve the operability and stability of a fuel cell as efficiently as those skilled in the art may like.

The description provided above as a related art of the present invention is just for helping understanding the background of the present invention and should not be construed as

SUMMARY OF THE DISCLOSURE

The present invention has been made in an effort to solve the above problems associated with the related art and an object of the present invention is to provide a heating method and apparatus for a fuel cell that reduce a cold-starting time through appropriate heating based in internal temperature distribution.

In order to achieve the objects of the present invention, a heating apparatus for a fuel cell includes heating units or structures that extend in the stacking direction of separators, in close contact with the upper ends and the lower ends of air intake sides of the stacked separators.

The heating apparatus may further include fastening bands that fasten the stacked separators so that the separators remain stacked, across the heating units. The ends of the heating units which are in contact with the separators may be coated with an insulating material, and the ends of the heating units opposite to the separators may be coated with a heat insulating materials as well.

A manifold part may be integrally formed or separately coupled to a side end of the air intake side of the separator, and the heating units may be coupled to be in close contact with the top and the bottom of the manifold part together with the air intake side of the separator, extending laterally. The heating units may be coupled to be in close contact with the side end of an air duct of the manifold part. The heating units may have heating capacity that increases in the air intake direction.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
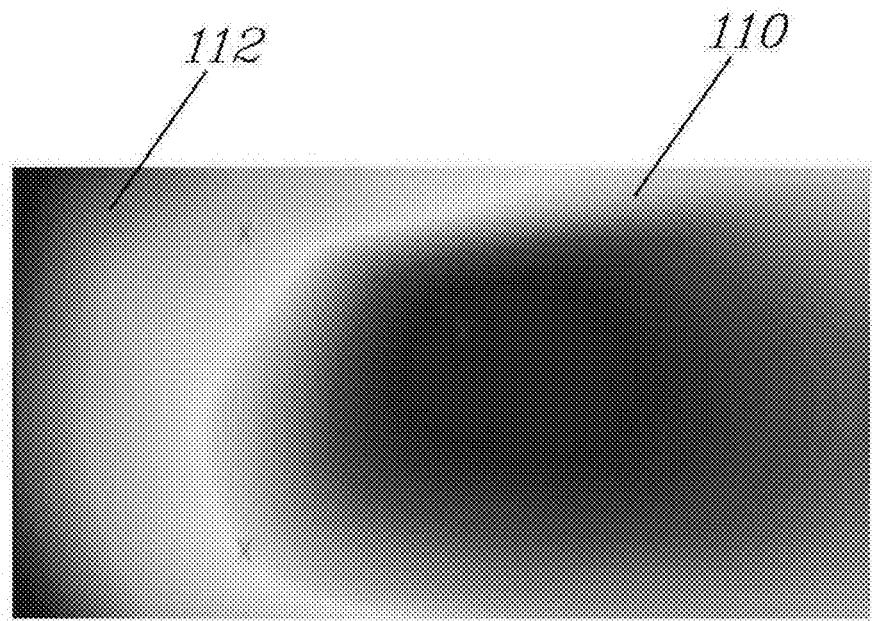
FIG. 1 is a picture showing temperature distribution of a separator of a fuel cell.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Heating apparatuses for a fuel cell according to exemplary embodiments of the present invention are described hereafter with reference to the accompanying drawings.

Figure 2:
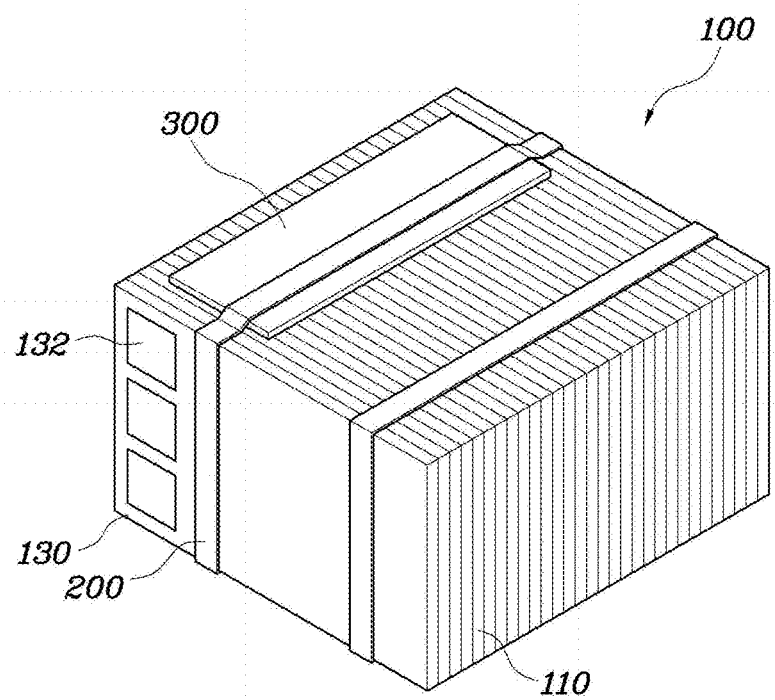
FIG. 2 is a perspective view of a heating apparatus for a fuel cell according to an exemplary embodiment of the present invention.
Figure 3:
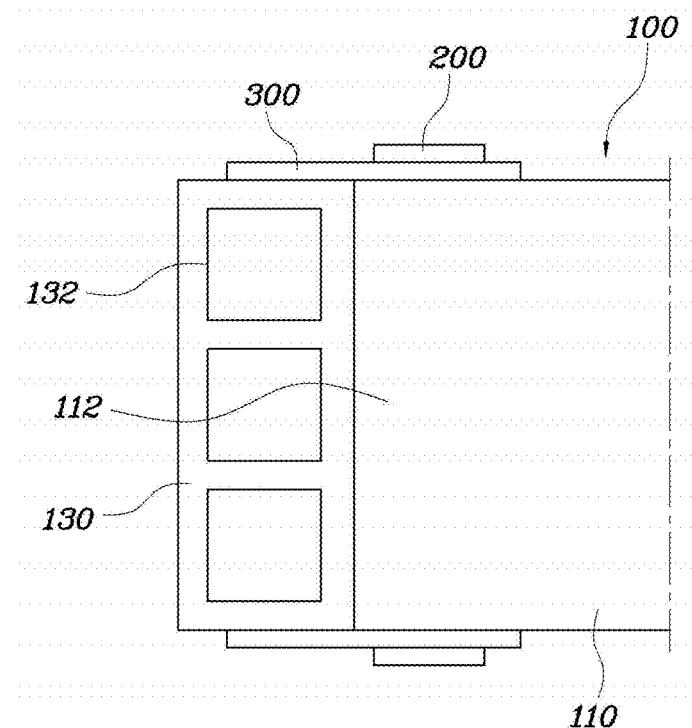
FIGS. 3 to 5 are views showing the configurations of heating apparatuses for a fuel cell according to various exemplary embodiments of the present invention.
Figure 4:
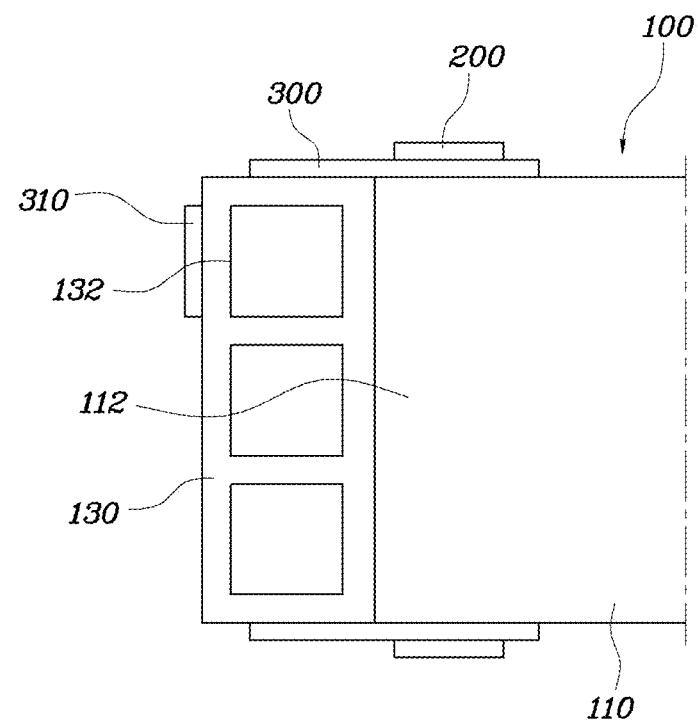
Figure 5:
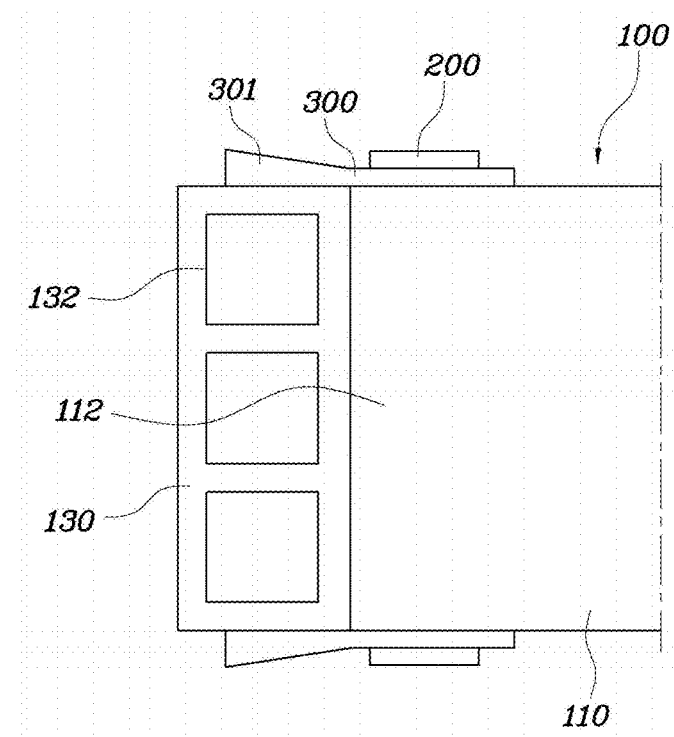

FIG. 1 is a illustration showing temperature distribution of a separator of a fuel cell, FIG. 2 is a perspective view of a heating apparatus for a fuel cell according to an exemplary embodiment of the present invention, and FIGS. 3 to 5 are views showing the configurations of heating apparatuses for a fuel cell according to various exemplary embodiments of the present invention.

An object of the present invention is to provide a heating apparatus for a fuel cell 100 that reduces a cold-starting time through appropriate heating based in internal temperature distribution.

As can be seen from FIG. 1, it was determined from a test that a fuel cell separator 110 shows a low temperature at the portion where air is introduced 112, rather than the center portion. Therefore, it is possible to achieve entire thermal balance by selectively heating the corresponding air intake side. That is, a temperature drop at a specific portion is prevented and overheating at another portion is prevented by heating a very low-temperature portion and not heating other portions which do not require heating.

In order to achieve the object of the present invention, a heating apparatus for a fuel cell 100 includes heating units (e.g., plates) 300 that are in close contact with the upper end and the lower end of the air intake side on stacked separators 110 and extends in the stacking direction of the separators 110.

FIG. 2 is a perspective view of a heating apparatus for a fuel cell according to an exemplary embodiment of the present invention, in which the heating units 300 are mounted on the upper end and the lower end of the air intake side of the fuel cell stack, because the internal temperature of the stack of separators is the lowest at the air inlet and the highest at the center during cold-starting. That is, the heating units are in contact with the top and bottom of the separators and the low-temperature areas are locally heated by an external heater, thereby contributing to increasing the temperature at a given portion of the stack.

One of fastening bands 200 that fastens stacked unit cells may be disposed across the low-temperature area effected by the cold conditions, and used to improve the operation of the stack without changing the existing structure by mounting a heater underneath the fastening bands 200. That is, the heating apparatus of the present invention may further include the fastening bands 200 that are fastened around the stacked separators so that the separators remains stacked, across the external surface of the heating units 300.

Meanwhile, a heater uses a current generated in low-temperature stack to heat the low-temperature portion of the stack and the magnitude of the heat applied is determined based on the temperature of the low-temperature area and thermal capacity. Furthermore, the ends of the heating units 300 which are in contact with the separators 110 may be coated with an insulating material. The ends of the heating units 300 opposite to the separators 110 may be made of a heat insulating material, as well.

A manifold part 130 may be integrally formed or separately coupled to a side end of the air intake side 112 of the separator 110 to allow air, fuel, and cooling water to flow, and the heating units may be coupled to be in close contact with the top and the bottom of the manifold part 130 together with the air intake side 112 of the separator, extending laterally, as shown in FIG. 3. Additionally, it is possible to more effectively heat the separators by arranging the heating units 300 in close contact with the side ends of air ducts 132 of the manifold part 130 such that only air intake portion is locally heated when the manifold is heated, as in FIG. 4.

Further, as in FIG. 5, the heating units 300 may be formed to have greater capacity toward the air intake side. That is, in this embodiment, it is possible to increase the heating capacity toward the low-temperature area by adjusting the cross-sectional area of a heat pipe during heating with cooling water or adjusting the cross-sectional area or the gap of heating wires when using heating wires of the PTC type. In the case shown in FIG. 5, the heating unit increases in thickness toward the air intake side, which is a low-temperature area, whereas it is possible to apply more heating toward the air intake side by adjusting the thickness or the gap of heating wires disposed inside, with the thickness of the heating unit unchanged. This is designed in consideration of a temperature gradient formed from the air inlet to the center and it is possible to reduce the entire temperature difference by forming and mounting a heater so that the amount of heat generation may be increased toward the inlet.

According to a heating apparatus for a fuel cell having the structure described above, it is possible to increase temperature while removing ices around the air inlet in the early stage of cold-starting. The difference between a high-temperature area and a low-temperature is reduced by removing in the possibility of failure during cold-starting through prevention of solidification of water produced in a low-temperature operation and by increasing the temperature of the low-temperature area which delays the cold-starting time and increases possibility of a failure, thereby increasing stability and reliability of the cold-starting operation.

Since water is prevented from being condensed by an increase in temperature of a low-temperature area under room temperature normal operation conditions and the upper/lower ends around the air intake are area where flooding may be generated due to low temperature even during a normal operation, flooding can be prevented by adjusting the temperature of a portion close to that of the high-temperature area.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A heating apparatus for a fuel cell comprising: heating units that are extended in a stacking direction of a plurality of separators, in contact with upper ends and lower ends of air intake sides of stacked separators, wherein the heating units have heating capacity that increases in an air intake direction, wherein a manifold part is integrally formed or separately coupled to a side end of an air intake side of each separator, and the heating units are coupled to be in contact with a top and bottom of manifold part together with the air intake side of the separator, extending laterally; wherein the heating units are in contact with a side end of an air duct of the manifold part.

2. The heating apparatus of claim 1, further comprising fastening bands that fasten the stacked plurality of separators so that the separators remain stacked, across the heating units.

3. The heating apparatus of claim 1, wherein ends of the heating units which are in contact with the separators are coated with an insulating material.

4. The heating apparatus of claim 1, wherein ends of the heating units opposite the separators are coated with a heat insulating materials.

\* \* \* \* \*